United States Patent

[11] 3,565,119

[72] Inventors William H. Pierpont, Jr.
Wichita;
Robert E. Smith, Halstead, Kans.
[21] Appl. No. 770,631
[22] Filed Oct. 25, 1968
[45] Patented Feb. 23, 1971
[73] Assignee Koch Industries, Inc.
Wichita, Kans.

[54] FILAMENT WOUND REINFORCED PIPE HAVING A VINYL ESTER RESIN INNER LINING
5 Claims, 3 Drawing Figs.
[52] U.S. Cl. ............................................. 138/132;
138/144; 138/153; 138/177
[51] Int. Cl. .............................................. F16l 11/08
[50] Field of Search ......................................... 138/132
(Cursory), 144 (Cursory), (Resin Digest)
(Cursory), 132, 144, 174, 177, 153

[56] References Cited
UNITED STATES PATENTS
| | | | |
|---|---|---|---|
| 2,747,616 | 5/1956 | DeGanahl ..................... | 138/132X |
| 2,815,043 | 12/1957 | Kleiner................... | 138/(Resin Digest) |
| 3,002,534 | 10/1961 | Noland......................... | 138/153X |
| 3,202,560 | 8/1965 | Michael........... | 138/(Fiberglass Digest) |
| 3,367,992 | 2/1968 | Bearden ................ | 138/(Resin Digest) |

*Primary Examiner*—Herbert F. Ross
*Attorneys*—Richard P. Crowley, Philip G. Kiely and Richard L. Stevens

ABSTRACT: Glass reinforced plastic pipe is provided having pretensioned filamentous reinforcements imbedded in a cured resin and having an inner layer or liner of a thermosetting resin prepared from: (1) a polymerizable monomer, such as styrene; and (2) 2-hydroxy alkyl acrylate or methacrylate dicarboxylic acid anhydride partial esters and the oxyalkylated derivatives thereof. Preferably, a release agent is incorporated into the thermosetting resin composition to facilitate removal of the finished pipe from the mandrel.

PATENTED FEB 23 1971

3,565,119

INVENTORS
WILLIAM H. PIERPONT, JR
ROBERT E. SMITH
BY
Crowley, Kiely & Stevens
ATTORNEYS

3,565,119

FILAMENT WOUND REINFORCED PIPE HAVING A VINYL ESTER RESIN INNER LINING

BACKGROUND OF THE INVENTION

This invention relates to glass reinforced resin pipe and more particularly the reinforced resin pipe having a liner or inner layer of a thermoset resin prepared from a vinyl ester.

Glass reinforced resin pipe is well known to the art and possesses a number of advantages over metal pipe, e.g. inertness, low weight, corrosive resistance, and high strength. These properties make such pipes particularly suitable for use in the chemical processing industry and more particularly in the oil industry for use as line pipe, down hole pipe, etc. Such pipes are composed of filamentous material, particularly fiber glass, wound around a mandrel and imbedded in resin which is subsequently cured. Because of the nature of the resins employed, it has been found necessary to apply a release agent to the mandrel on which the reinforced pipe is formed prior to contacting the mandrel with resin to prevent the adhesion of the resin to the mandrel.

Although a number of release agents are available, the principle release agent is paraffin wax. The use of the wax, however, while providing satisfactory release properties, introduces additional steps directly and indirectly into the manufacture of the pipe. Care must be taken in the application of the wax to insure that no portion of the mandrel is left uncovered otherwise the resin may adhere to the mandrel resulting in damage to either the mandrel or the pipe in removing the pipe after it has been formed on the mandrel. After the pipe has been formed, it is necessary to remove the paraffin wax from the finished pipe by suitable means, e.g. heat. Thus, the steps of removing and reclaiming the wax and, in addition, the necessity for the inspection of the pipe to insure that the wax has been completely removed, adds time and expense to the processing involved in the pipe manufacture. The mandrel, also, must be processed to remove any residual wax.

It has now been found that filament-wound, reinforced resin pipe can be produced which eliminates the necessity for the separate application of a parting or release agent on the mandrel and which provides pipe with properties superior to those which have been heretofore obtainable.

SUMMARY OF THE INVENTION

The filament reinforced resin pipe of the present invention is composed of a cured resin and tensioned strands of substantially longitudinal and helical filaments arranged generally parallel and transversely, respectively, to the longitudinal axis of the pipe, with an inner layer or lining of a thermoset resin of the vinyl ester type. The aforementioned vinyl ester resins are prepared from 2-hydroxy alkyl acrylate or methacrylate dicarboxylic acid anhydride partial esters and the oxyalkylated derivatives of these esters mixed with a polymerizable monomer. These vinyl ester resins are set forth in U.S. Pat. No. 3,367,992 issued Feb. 6, 1968, which is incorporated by reference herein in its entirety.

The above-mentioned vinyl ester resins provide hard, tough, glossy, transparent and adherent continuous thermosetting layers of excellent strength, heat and solvent resistance.

By applying an initial layer of the vinyl ester resin to the mandrel and then overwinding the inner layer with filamentous material such as glass roving saturated with a resin such as an epoxy resin, the resulting pipe will possess improved strength characteristics than one composed solely of epoxy and filamentous material, and, in addition, would be easily removable from the mandrel without the necessity of a separate application of a parting agent. The thickness of the inner layer preferably ranges from 5 to 15 mils, preferably 10 mils.

DETAILED DESCRIPTION

The novel pipe of the present invention is composed of an inner layer of a thermoset resin prepared from 2-hydroxy alkyl acrylate or methacrylate dicarboxylic acid anhydride partial esters and the oxyalkylated derivatives thereof of these esters, and a polymerizable monomer, which is overwound with filament winding such as fiber glass roving imbedded in a cured resin such as an epoxy resin. Although the above described thermoset vinyl ester resins are known to the art and have been taught for use in forming laminates of, for example, a glass cloth, their use in manufacture of filament reinforced pipe has been contraindicated because of the problem of shrinkage which results in delamination in a relatively thick walled material. Thus, while the vinyl ester resins have been suitable in the past for some applications where shrinkage is minimal or where shrinkage is not a problem, they have not been suitable for use in resin reinforced pipe where the the problem of shrinkage is of considerable significance.

However, it has now been found that superior reinforced plastic pipe can be formed employing the indicated vinyl ester resins as the inner layer and incorporating in the resin composition a parting agent which migrates to the mandrel during cure, thus releasing the pipe from the mandrel.

Figure 3:
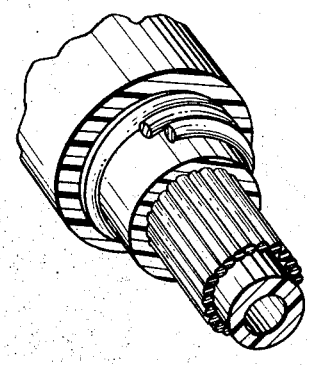
FIG. 3 is a perspective view of the pipe.
Figure 1:
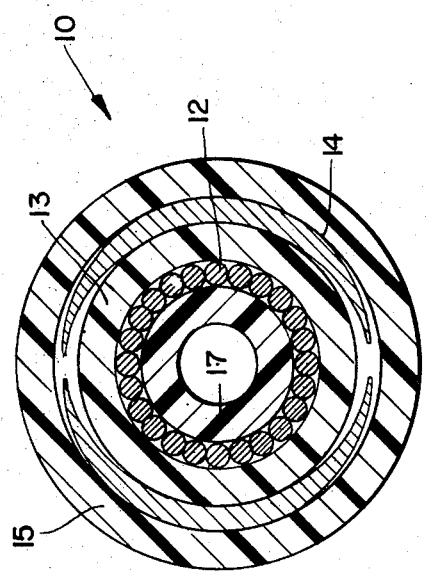
FIG. 1 is an enlarged sectional view of a pipe of the present invention.

Referring now to FIG. 1 it is shown a cross-sectional view of the novel pipe 10 of the present invention which is composed of alternate helically wound layers 15 and 13 and longitudinal layers 12 and 14 of glass roving imbedded in cured resin. A vinyl ester resin layer 17 lines the inner wall of the pipe. FIG. 3 is a perspective view of the pipe shown in FIG. 1.

The thermosetting resins employed in the inner lining of the pipe are prepared from the above-described partial esters and their oxyalkylated derivatives by mixing from about 30 to 90 percent by weight of the ester with about 10 to 70 percent, preferably 45 to 50 percent, by weight, of an ethylenically unsaturated cross-linking monomer. Preferably styrene is employed; however, other polymerizable monomers such as orthochlorostyrene, vinyl toluene and cyclohexylacrylate are also suitable. If the use of a parting agent is desired in the resin, a conventional parting agent, such as a tall oil phosphate (ZELEC UN, a trademark of DuPont) is incorporated into the resin mixture. Any suitable release or parting agent can be employed so long as it is compatible with the resin. Alternatively, a parting agent, such as wax, can be applied to the mandrel prior to the application of the resin.

Figure 2:
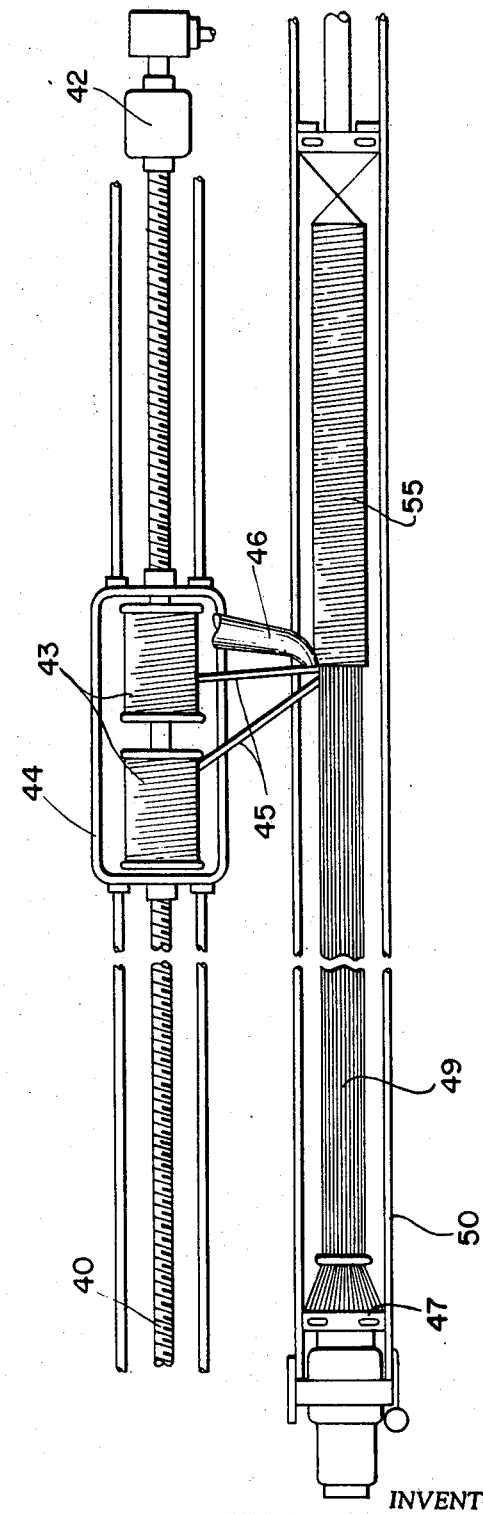
FIG. 2 is a plan view of the apparatus employed for making the reinforced plastic pipe of the present invention.

The thus-formed resin is then applied to a mandrel by any suitable means, for example, brushing, spraying, flowing, or reverse roller coating, and the like. The thus-formed resin layer is then overwound with filamentous material imbedded in resin, for example, on the lathe type apparatus schematically shown in FIG. 2. As stated above, the preferred materials employed are fiberglass roving and epoxy resin. In the apparatus shown in FIG. 2, longitudinal strand assemblage 49, placed under tension by means, for example, of a locking ring 47, is placed over the vinyl ester resin layer initially applied to the mandrel. A spiral wrap glass roving 45 with widely spaced helicies is wound around the longitudinal assemblage 49 to provide good contact with the coating of the vinyl ester resin on the mandrel surface. Platform 44 is reciprocally movable along the length of the adjacent rotating mandrel by means of rotating screw 40 which is driven by the reversible motor 42. Mounted on platform 44 are two spools 43 of glass roving which are controlled so as not to rotate until a predetermined torque is applied thereto. Glass roving strands 45 are fed from spools 43 and helically wound around the rotating mandrel and overlying stand assemblage 49 so as to form a layer 55. Simultaneously with the wrapping of the glass roving, resin is deposited thereon from resin dispenser 46 which serves to saturate the glass roving. The sequential application of longitudinal and helical layers of glass roving is continued until the desired wall thickness of the pipe is achieved. Pipe of the present invention have been found to possess a strength greater than that found in conventional resin reinforced pipe of the same wall thickness. Thus, pipe of strength comparable to conventional pipe could be achieved with substantially thinner walls.

After the application of the alternate layers of longitudinal and helical glass roving imbedded in a curable resin is complete, the vinyl ester resins and the resin saturating the roving is then cured by appropriate means, i.e., by the employment of accelerators or catalysts in the resin or by external curing conditions such as the application of heat to the pipe. During curing cycle, the vinyl ester resins separate from the mandrel by virtue of the migration of the parting agent and a slight change in size of the pipe resulting in a slight longitudinal contraction and axial expansion, thus permitting ready removal of the finished pipe from the mandrel without the possibility of damage to the pipe or to the mandrel and leaving the mandrel free to be reused immediately with little, if any, cleaning or treatment.

In an alternative embodiment, it may be desirable to effect a partial cure to the initial layer of resin on the mandrel prior to winding the roving thereon.

In a particular preferred embodiment the initial layer of vinyl ester resin includes a layer of filament winding incorporated directly in said vinyl ester resin layer. The winding is preferably a helical winding and while the angle of winding is not critical it is preferred the angle range from of winding is not critical it is preferred the angle range from 54° to 85°. The winding layer need not be continuous and can include gaps between the parallel strands of glass roving. The size of such gaps is limited only by the necessity for avoiding the fish eyes or holes in the resin layer. When a filament layer is incorporated therein, the resin layer is preferably 10 to 30 mils in thickness.

It should be understood the angle of winding of the alternate layers of filaments is not critical, and a wide variety of angles is available.

The vinyl ester resin layer may also contain suitable fillers known to the art, for example, clays, talc, calcium carbonate, carbon black, asbestos, metal powders, and the like, as well as short pieces of filamentous material such as chopped up glass roving.

Epoxy resins are preferred for saturating the filaments of the present invention. The term "epoxy resin", as used herein, denotes the resinous reaction product of certain epoxide compounds and compounds having available hydrogen atoms linked to carbon atoms by oxygen atoms, as, for example, polyhydric phenols and polyhydric alcohols. A particularly useful epoxy resin is the reaction product of an epihalohydrin and a polyhydric phenol, as exemplified by bisphenol-epichlorohydrin. Suitable epoxy resins include the reaction products of epihalohydrins and polyhydric alcohol such as ethylene glycol, propylene glycol, trimethylene glycol and the like. Other equivalent epoxy resins are well known to those skilled in the plastics art.

Other suitable resins include polyester resins, and, in particular, the alkyd resins comprising the reaction product or copolymers of polyhydric alcohols and dibasic acids. Typical of the large number of available polyester resins are the copolymers of phthalic anhydride and a polyhydric alcohol such as ethylene glycol, diethylene glycol or glycerine, maleic anhydride and a polyhydric alcohol, sebasic acid and a polyhydric alcohol, and diethylene glycol and bisallyl carbonate. These and equivalent polyester resins are advantageously partially polymerized prior to their incorporation in the plastic composition, and may be modified in the manner known in the art by the admixture therewith of such modifiers as epoxidized oils and unsaturated fatty acids. If desired, suitable polyester polymerization catalysts well known to the art may also be included in composition.

Other polymers that can be employed include the acrylic compounds, and the phenol-formaldehyde, furfuralformaldehyde, and resorcinol-formaldehyde resins. Moreover, the saturating material need not be in every case what is commonly known as a "resin". For example, substances such as phthalic anhydride and diallyl phthalate may be employed as a thermosetting reactive material in the plastic composition.

I claim:

1. A filament reinforced resin pipe comprising a cured first resin and tensioned strands of longitudinal and helical filaments arranged substantially parallel and transversely, respectively, to the longitudinal axis of said pipe and imbedded in said cured first resin; said pipe containing an inner layer of a cured thermoset second resin prepared from a mixture of a 2-hydroxy alkyl acrylate or methacrylate dicarboxylic acid anhydride partial ester and the oxyalkylated derivatives thereof and a polymerizable monomer, said second resin containing a parting agent compatible with said second resin, which parting agent migrates to the mandrel during cure, said cured thermoset second resin having a greater degree of contraction than the cured first resin which degree of contraction facilitates the removal of the pipe from a mandrel when the pipe is formed.

2. The product of claim 1 wherein said filaments are imbedded in cured epoxy resin.

3. The product as defined in claim 1 wherein said filaments are glass roving.

4. The product as defined in claim 1 wherein said partial ester is the 2-hydroxy ethyl acrylate-maleic anhydride half ester; and the polymerizable monomer is styrene.

5. The product as defined in claim 1 wherein said inner layer includes a layer of filament winding therein.